Feb. 20, 1934. T. DE PORT 1,947,461
TIP FLAP AILERON
Filed Aug. 22, 1930 2 Sheets-Sheet 1

INVENTOR
THEOPHILE DE PORT
BY Robert H. Young
ATTORNEY

Feb. 20, 1934.     T. DE PORT     1,947,461
TIP FLAP AILERON
Filed Aug. 22, 1930     2 Sheets-Sheet 2
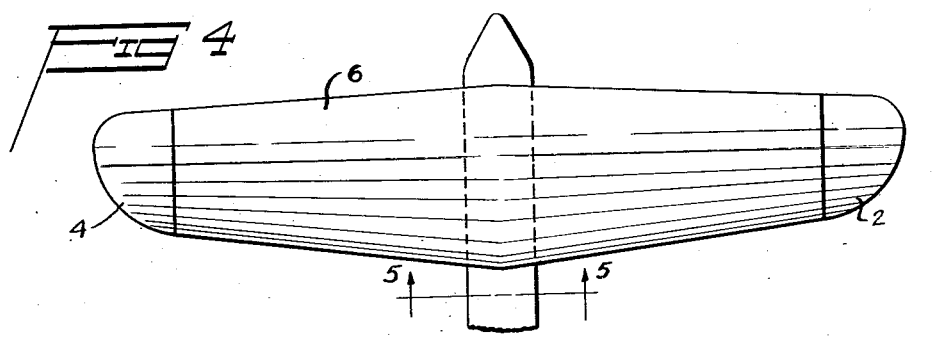
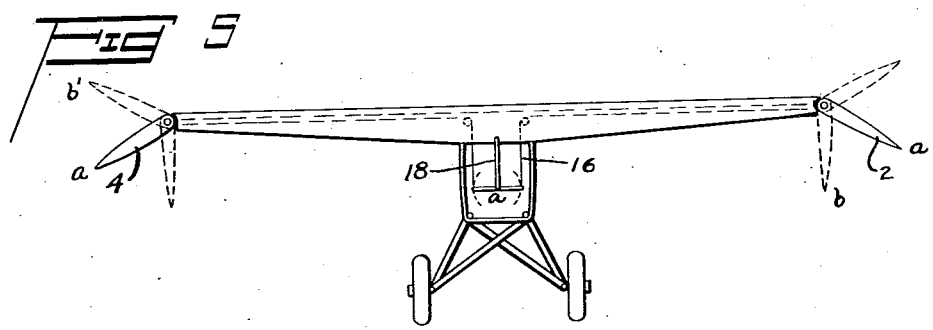
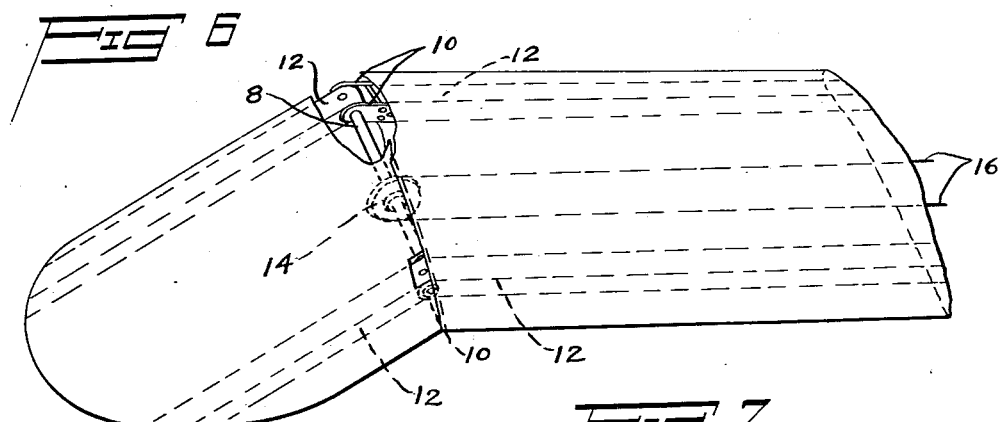
INVENTOR
THEOPHILE DE PORT
BY Robert H. Young
ATTORNEY Patented Feb. 20, 1934

1,947,461

UNITED STATES PATENT OFFICE 1,947,461

TIP FLAP AILERON

Théophile de Port, Dayton, Ohio

Application August 22, 1930. Serial No. 477,090

7 Claims. (Cl. 244—29)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to a novel method and means for lateral control in aircraft and more especially flying machines.

My invention has for its primary object to provide a novel method and means whereby an airplane may be controlled laterally at low angles of attack, or angles up to the "stalling" angle, and at high angles of attack, or angles beyond the "stalling" angle, and whereby when the airplane is rolled about an axis lying in the direction of flight, to prevent the same from yawing in an undesirable direction at low angles of attack and to cause the same to yaw in a desirable direction at high angles of attack.

Known methods of lateral control for airplanes permitted the controllability of the airplane up to the stalling angle. Beyond the stalling angle the differential in lift, which produces the rolling moment, was of such a character as to produce a rolling moment in the airplane in a direction opposite to that desired.

It is further known that in the use of lateral controls of conventional construction, such as the aileron or the like, for effecting a rolling moment of the airplane at any angle of attack the differential in lift produces a differential in the yawing moment which is of an undesirable character both for low and high angles of attack. For example, at low angles of attack the yawing moment tends to turn the airplane towards the side of greater lift, thus necessitating the use of a compensating means such as a vertical rudder for opposing this tendency in order that the airplane may be maintained in the desired direction. At high angles of attack the rolling moments being uncontrollable, as above pointed out, any falling off of the airplane towards one side or the other cannot be checked and the yawing moments produced further contribute towards uncontrollability of the airplane and generally result in falling into a spin.

Two factors, namely the differential of lift and the differential of drag, have entered into consideration in all known methods of lateral control. The differential of lift, in accordance with known methods, was effected by increasing the camber or angle of attack of a portion of the wing on one side and decreasing the camber or angle of attack of a portion of the wing on the other. In producing a differential of lift in this manner the drag on the one side was greater than that on the other, the greater drag being on the side of greater lift. This increase of drag on the side of increased lift causes the airplane to yaw in the undesired direction and is substantially due to the increase of induced drag as expressed by the following relation:

$$C_{DI} = \frac{C_L^2}{EMAR} \times \text{Const.}$$

in which $C_D$ is the coefficient of induced drag, $C_L$ is the coefficient of lift, and EMAR is the equivalent monoplane aspect ratio or effective aspect ratio. It is evident from the above equation that in order to prevent an increase in the induced drag when the airplane is rolled due to a differential of lift, that the effective aspect ratio must be increased on the side of increased lift.

I have found by aerodynamic investigation and actual tests that my invention has the effect of virtually increasing the effective aspect ratio on the side on which an increase in lift is desired and simultaneously decreasing the effective aspect ratio on the opposite side so that a lateral control of the airplane can be attained without any substantial variation of induced drag; that the differential in the lift beyond the stalling angle is of the same character as that present in angles of attack smaller than the stalling angle, thus insuring a rolling moment in the desired direction regardless of the angle of attack of the airplane, and that it is possible to effect a differential of lift without substantially creating the undesirable differential of drag, which, as heretofore noted, results in an undesirable yawing of the airplane.

It is also well known that the lift coefficient of a wing or similar supporting surface having the conventional type of lateral controls falls off when the aircraft is rolled by the use of such controls at small angles of attack and considerably so at high angles of attack. In accordance with the use of my invention for rolling the aircraft there is substantially no loss for any given angle of attack in the lift efficiency of the supporting surface.

In the drawings affixed to the specification and forming a part thereof:

Figs. 1, 2, and 3 are diagrams illustrating the principle involved.

Fig. 4 is a schematic top plan view of an airplane embodying my invention.

Fig. 5 is a diagrammatic sectional rear view of the airplane taken on the line 5—5 of Fig. 4, showing the lateral controls in dotted outline in their raised and lowered positions.

Fig. 6 is an enlarged perspective view of the aileron with parts broken away to show the control and hinge connection to the outer end of the wing.

Figs. 7 and 8 are diagrammatic views showing slight variations in the normal position of the ailerons relative to the wing.

Figure 1:
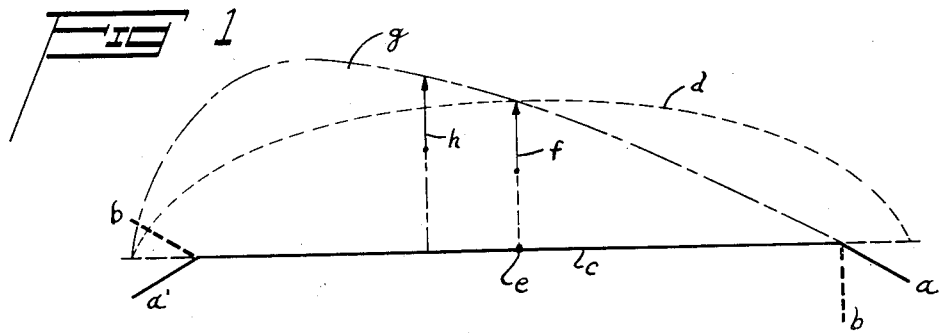

The principle underlying my novel method of lateral control for all angles of attack is exemplified in a simple manner by the arrangement illustrated in Fig. 1, in which the positions of the ailerons are diagrammatically illustrated in heavy dark and dotted lines, $a$, $a$, $b$, $b'$, as tiltably connected to wing surface, as represented by line $c$, the heavy dark lines $a$, $a$, representing the normal position of the ailerons; and the heavy dotted lines $b$, $b'$, representing the ailerons operated to a position for obtaining a rolling moment.

In the normal position of the ailerons the pressure or lift distribution, illustrated by the line $d$, is symmetrical about the longitudinal axis $e$, which axis passes through the center of gravity of the airplane, and the resultant lift force as indicated by the arrow $f$ also passes through the center of gravity. It is well known that when the resultant lift force passes through the center of gravity there can be no rolling moment.

In the rolling position of the ailerons, one aileron being below the normal position and the other aileron being above its normal position, the pressure of lift distribution is no longer symmetrical about the longitudinal axis $e$, as illustrated by the line $g$, and the resultant lift force, illustrated by the arrow $h$, has shifted toward the side of the raised aileron tending of course to roll the airplane (Figs. 4 and 5) in a clockwise direction as viewed in the direction of flight.

Figure 2:
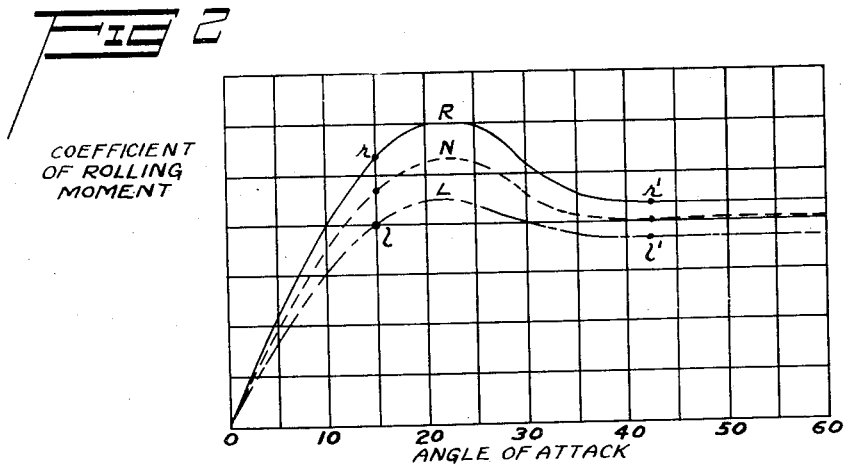

The diagram shown in Fig. 2 illustrates, in accordance with my invention, that, regardless of the angle of attack of a wing, the rolling moment of the airplane is always in the same direction for similar settings of the ailerons. For example, let us assume that one aileron is lowered and the other aileron is raised for rolling shown in Fig. 1, it is found by plotting the curve L for any given angle of attack that the coefficient of the rolling forces for the side of lowered aileron has values less than the values of the coefficients of the rolling forces when the aileron is in neutral position as represented by the line N, and that the coefficient of the rolling forces for the raised aileron as represented by the curve R, has values greater than the coefficients of the resultant forces when the aileron is in neutral position. It will therefore be seen that for any given angle of attack of the wing, either below or above the stalling angle as represented by the points $l$ and $r$ or $l'$ and $r'$ respectively, the values of the resultant force on the side of raised aileron, that is on the left side of the wing in Figs. 4 and 5, are greater than the values of the resultant force on the side of lowered aileron, that is the right side of the wing. Consequently the rolling moment produced by the difference of these forces tends to rotate the wing always in the same direction.

Figure 3:
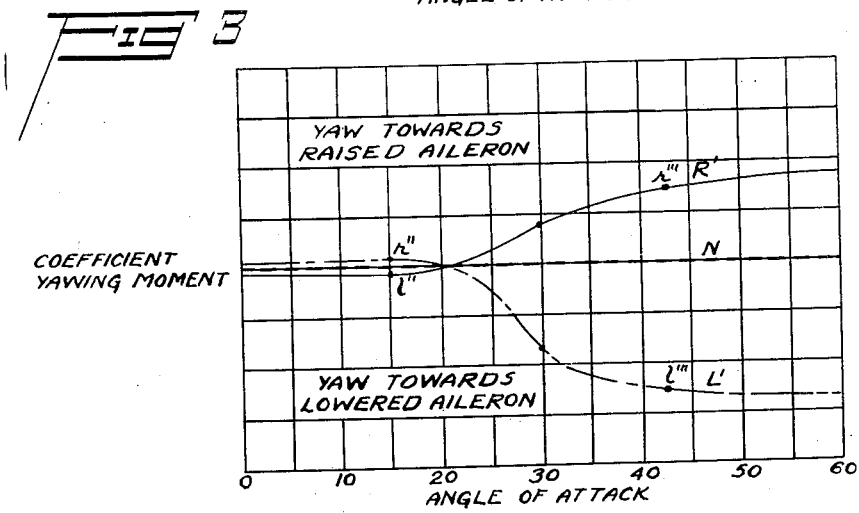

Let it again be assumed that one aileron is lowered from neutral position and the other aileron is raised from neutral position as shown in Fig. 1. By plotting the yawing moments at all angles of attack for each of the ailerons and drawing a line through the plotted points, the curves L' and R' for the lowered and raised ailerons respectively are attained, as shown in Fig. 3. For any two points such as $l''$ and $r''$ on the curves L' and R' at the same angle of attack, and approximately up to stalling angle the differential in the yawing moments is seen to be negligible. Beyond the stalling angle the differential expressed by the points $l'''$ and $r'''$ denotes a yawing tendency toward the lowered aileron.

It will thus be seen that when a differential of lift is produced in accordance with my invention as illustrated in Fig. 1 by the use of either one or both of the ailerons the yawing moment on the wing for any operable position of one aileron as well as the yawing moment for any operable position of both ailerons are negligible at low angles of attack and that at high angles of attack the yawing moment of the lowered aileron is comparatively greater than the yawing moment of the raised aileron, resulting of course in a differential in the yawing moments which tends to cause the aircraft to yaw towards the lowered aileron. Aircraft in accordance with my invention may thus be constructed without a rudder and directional steering can readily be attained by lowering the aileron on the side toward which the aircraft is desired to be turned and increasing the angle of attack of the wing to the point where the yawing moment of the lowered aileron is greater than that of the raised aileron.

Referring now to the particular construction and design represented in Figs. 4, 5, and 6, which illustrate a simple embodiment of my invention, as seen in plan Fig. 4, the ailerons 2 and 4 are preferably shaped roughly elliptical on one side and with a straight edge on the other, each aileron forming a continuation of the surface outline of the wing 6, thereby constituting the tip end of its respective side of the wing to which it is hingedly connected for angular movement about an axis substantially parallel to the axis of the wing. This hinge connection which may be of any suitable construction is identical for each aileron and as shown in Fig. 6 consists of a shaft 8 fixedly connected to the aileron and supported by the brackets 10 that are attached to spars 12 of the wing.

Any known gearing can be adapted for the purpose of operating the ailerons 2 and 4, and by way of example as shown in Figs. 5 and 6 the means of operating the ailerons consists of pulleys 14 fixed upon the axles 8 and a wire cord 16 passed around same and suitably connected to the control stick 18 in any well known manner so that the ailerons may be differentially operated from neutral position $a$, that is to say as the aileron 2 is lowered the aileron 4 is raised and vice versa. It will, of course, be understood that the ailerons may be connected to the control stick so that only one is operated at a time. Since it is possible to increase or decrease the effective aspect ratio on one side of the wing by raising or lowering respectively the aileron attached to that side it will be obvious that lateral stability and control can be had by the use of only one aileron at a time.

The full outline of the ailerons 2 and 4 shown in Fig. 5 denotes the normal position of the ailerons and the dotted outlines the maximum lowered and raised positions to which each aileron is tiltable to obtain a minimum and maximum lift respectively on each side of the wing. Between these two extreme positions it is possible to obtain infinitely small variations of effective aspect ratios from the effective aspect ratios of the wing when the ailerons are in neutral position.

Since, as above stated, the coefficient of lift of the wing for any angle of attack is not substantially affected by the use of my ailerons for rolling, it is readily obvious that an airplane may be constructed in which the elevators would not have to be operated simultaneously with the operation of the ailerons to maintain constant altitude when the airplane is making a turn in its direction of flight.

While I have shown and described my invention as applied to a monoplane type of airplane, it is evident that the same could be applied to an aircraft having two or more main supporting surfaces, and that various changes and modifications, obvious to persons skilled in the art, may be made without departing from the spirit of my invention.

What I claim as new and desire to secure by Letters Patent is:

1. In an inherently stable airplane, a supporting surface having its longitudinal axis disposed in the vertical plane including the longitudinal axis of said airplane and a pair of control surfaces pivoted to the extremities of said surface and normally disposed with respect thereto to provide substantially an aerodynamically uninterrupted surface therewith in every operative position of said control surfaces and means for controlling said control surfaces for respectively increasing or decreasing the effective aspect ratio on one side of said axis and decreasing or increasing the effective aspect ratio on the other side and to prevent a yawing of the airplane without producing at the same time any appreciable yawing within the range of flying angles substantially up to the stalling angle.

2. In an inherently stable airplane, a supporting surface having its longitudinal axis disposed in the vertical plane including the longitudinal axis of said airplane and control surfaces pivoted at the extremities, each end thereof and normally disposed with respect thereto to provide substantially an aerodynamically uninterrupted surface therewith in every operative position of said control surfaces and manual means for controlling said control surfaces for respectively increasing or decreasing the effective aspect ratio on one side of said axis and decreasing or increasing the effective aspect ratio on the other side and without producing at the same time any appreciable yawing moment within the range of flying angles at least up to the stalling angle.

3. In an inherently stable airplane, a supporting surface having its longitudinal axis disposed in the vertical plane including the longitudinal axis of said airplane, and a tiltable control surface at the end of said supporting surface and forming therewith a substantially aerodynamically uninterrupted surface in every operative position of said control surface, said control surface being angularly movable relative thereto for increasing or decreasing the effective aspect ratio on one side of said airplane and for introducing a yawing of said airplane towards the region of decreased effective aspect ratio and away from the region of increased effective aspect ratio beyond the stalling angle.

4. In an inherently stable airplane, a substantially rigid supporting surface, a flexible surface at each end of said first mentioned surface forming a substantially aerodynamically uninterrupted surface therewith in every operative position thereof and being adapted for the lateral control of said airplane, said flexible surfaces being angularly movable about axes substantially parallel to the longitudinal axis of said rigid surface and control means for actuating said flexible surfaces to either increase or decrease at will the effective aspect ratio on either side of the longitudinal axis of said airplane and to maintain the yawing moments at small angles of attack substantially equal on each side of said airplane.

5. In an inherently stable airplane, a supporting surface, a control surface connected at one end of said first mentioned surface forming in every operative position thereof an unbroken continuation of said supporting surface without producing at the same time any appreciable yawing moment within the range of flying angles substantially up to the stalling angle and adapted to be pivoted about an axis that is substantially parallel to the longitudinal axis of said supporting surface for the lateral control of said airplane and means to actuate said control surface to increase or decrease the effective aspect ratio of said surfaces and to effect a yawing of the airplane towards the region of decreased aspect ratio and away from the region of increased aspect ratio beyond the stalling angle.

6. In an inherently stable airplane, a supporting surface, a flexible surface at each end of said supporting surface for the lateral control of said aircraft, said surfaces forming in every operative position thereof a substantially unbroken continuation of said supporting surface and control means for tilting said flexible surfaces angularly relative to the longitudinal axis of said supporting surface to either increase or decrease at will the effective aspect ratio on either side thereof, and whereby when said flexible surfaces are in tilted position the yawing moments at small angles of attack are substantially equal on each side of said airplane substantially up to the stalling angle and are unequal beyond the stalling angle to effect yawing towards the side of decreased effective aspect ratio.

7. In an inherently stable airplane, a supporting surface having a longitudinal axis disposed in the vertical plane including the longitudinal axis of said airplane, lateral control surfaces for said airplane disposed at opposite ends of said supporting surface and forming in every operative position thereof an unbroken continuation with said supporting surface and normally arranged with respect thereto, each of said control surfaces being adapted for movement about an axis substantially parallel to said longitudinal axis whereby said airplane is controllable at all angles of attack of said supporting surface, and whereby when the airplane is rolled about its longitudinal axis, the same is substantially prevented from yawing in an undesirable direction at low angles of attack and is caused to yaw in a desirable direction at high angles of attack.

THÉOPHILE DE PORT.